United States Patent [19]

Quaintance William J.

[11] 4,001,561
[45] Jan. 4, 1977

[54] DEVICE FOR MEASURING AND INDICATING READING SPEED

[76] Inventor: William J. Quaintance, 8605 Cheltenham Ave., Philadelphia, Pa. 19118

[22] Filed: Sept. 4, 1975

[21] Appl. No.: 610,173

[52] U.S. Cl. .......................... 235/151.32; 235/92 T
[51] Int. Cl.$^2$ .................. H03K 21/36; H03K 21/18
[58] Field of Search .......... 235/151.32, 92 T, 92 R, 235/92 CA; 58/24 A

[56] References Cited
UNITED STATES PATENTS

| | | | |
|---|---|---|---|
| 3,876,867 | 4/1975 | Schull et al. | 235/92 T |
| 3,876,869 | 4/1975 | Houpt | 235/92 T |
| 3,878,370 | 4/1975 | Santomango et al. | 235/92 T |

*Primary Examiner*—Edward J. Wise
*Attorney, Agent, or Firm*—Frederic W. Neitzke

[57] ABSTRACT

A device for measuring and indicating reading speed in words per minute. The length of any reading assignment up to 9,999 words is set on an input counter on the device. The device is turned on when the reader starts reading the text. At the end of 1 minute, and for every 3 seconds thereafter, light emitting diodes on the device display the reading speed in words per minute. The reader determines his reading speed by observing the reading speed device immediately after reading the passage.

4 Claims, 2 Drawing Figures

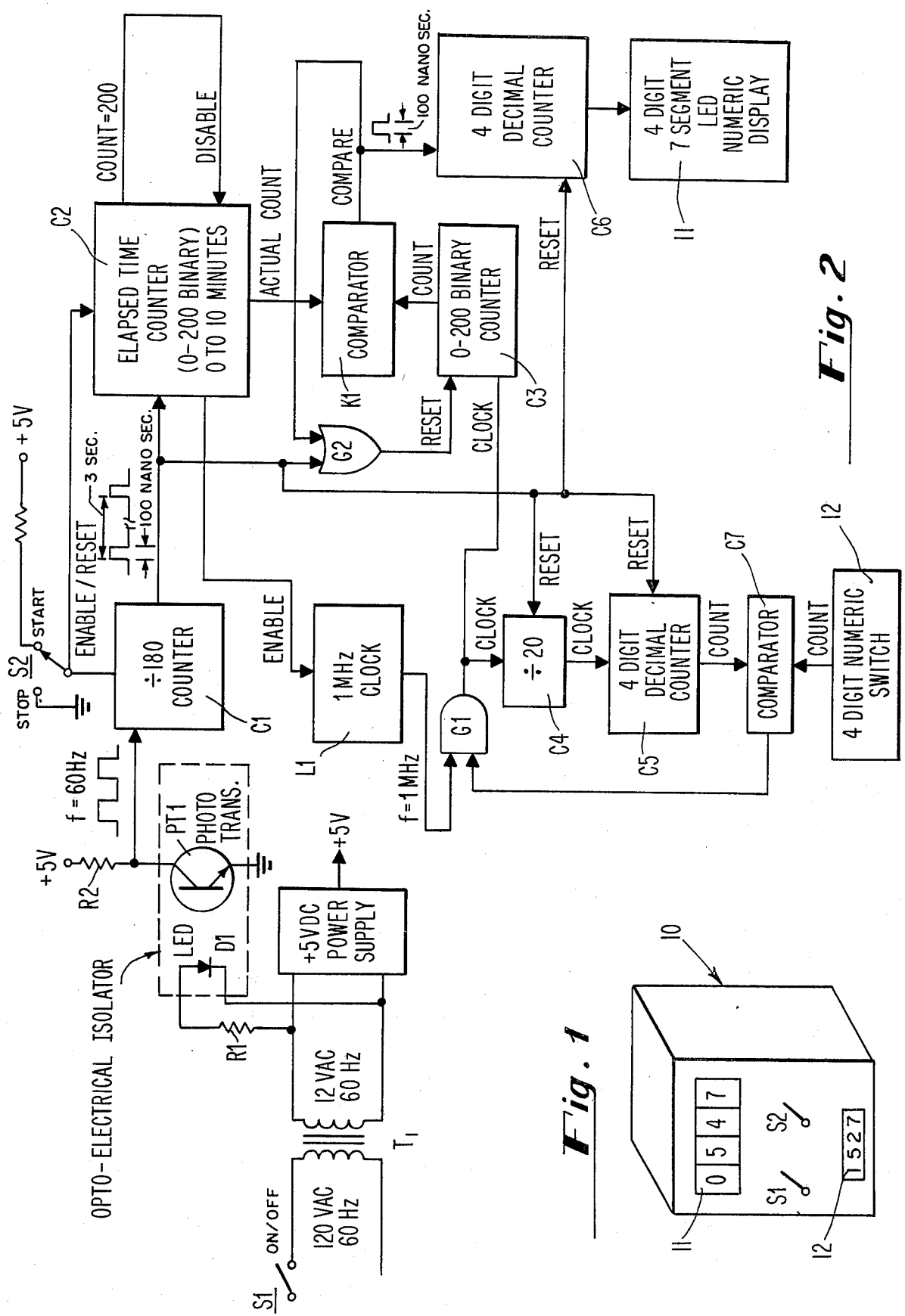

DEVICE FOR MEASURING AND INDICATING READING SPEED

BACKGROUND OF THE INVENTION

This invention relates generally to arithmetic computation and more particularly to the computation of a reading speed in words per minute for a given passage. Reading speed is usually expressed as a rate, and frequently this rate is expressed as words per minute. To determine this rate, it is necessary to know the number of words in a given passage of textual material and the amount of time the reader takes to read this passage. Since these tests are usually of fairly brief duration an accurate measurement of time is usually made in seconds. It is then possible to calculate words per minute by dividing the number of words in the textual material by the reading time in seconds and multiplying this fraction by 60.

The method described above involving a formula is time-consuming and prone to inaccurate results because of faulty mathematics. Each reader must make an individual computation, and if a class of students is involved, the teacher must check each students computation. Alternate methods, such as the use of approximations or tables, are also inaccurate and/or unsatisfactory for the same reason.

SUMMARY OF THE INVENTION

It is a primary object of this invention to provide a time which computes words per minute electronically and which is simply and economically fabricated. In operation, the device functions as follows:

1. The number of words in a given passage of textual material to be read is determined.
2. The number of words to be read is set on a numeric switch of the timing device.
3. The timing device is turned on and, as the reader begins reading the text, a timing circuit is activated.
4. At the end of 1 minute, and for every three seconds thereafter, the reading speed in words per minute is displayed on light emitting diodes on the timing device. The reader, who began reading when the timer was activated, glances at the machine as soon as he finishes reading the textual material and determines his reading rate by observing the indicated words per minute.

Accordingly, it is a primary object of this invention to provide an electronic device which will automatically calculate and display a reading rate in words per minute.

It is another object of this invention to provide a device for calculating words per minute which is simple and economical to fabricate and which is accurate and easy to use.

It is another object of this invention to provide a reading device which can be used by many reading students simultaneously to obtain individual computations of reading speed in words per minute.

BRIEF DESCRIPTION OF THE DRAWINGS

FIG. 1 is a perspective illustration of the words per minute timer and indicator;

FIG. 2 is a block diagram of the words per minute timer and indicator.

DESCRIPTION OF THE PREFERRED EMBODIMENT

FIG. 1 shows a schematic illustration of the appearance of the words per minute timer and indicator. Of course, this device can be made in any convenient size and could be adapted for use by an individual, who might hold the device in his hand or put it on his desk while reading. It might have a larger display, suitable for use by a large group simultaneously. A prototype model has been constructed which weighs 4½ pounds and which uses 1 inch high light emitting diodes. For large groups, it may be desirable to have light emitting diodes of a 2 inch size or larger.

The timer and indicator (10) has three external controls S1, S2, and numeric switch 12, as illustrated. S1 is a single-pole single-throw switch to apply power to the timer. This switch is normally left on while the timer is operating. Switch S2 is used to initiate the timing sequence. Switch S2 is a single-pole double-throw switch with two positions, Stop, and Start. This switch is used to initiate the timing sequence as will be explained in more detail below.

Numeric switch 12 is used to input a number corresponding to the number of words to be read by the person whose reading speed is to be measured.

FIG. 2 is an overall block diagram of the timer and indicator. As illustrated, power is applied to the timer and indicator from a conventional 120 volts alternating current 60Hz source. Switch S1 is a power supply switch. This input power is fed into a 10-to-one step down transformer T1 providing a single phase 12 volt Ac 60Hz output voltage. This output voltage is applied to a 5 volt DC power supply to provide the necessary systems operating voltage and in addition the output of transformer T1 has a current limiting resistor R1 and light emitting diode D1 shunting it. D1, as shown, is a part of an opto-electrical isolator. D1 activates a phototransistor PT1 which, as shown, is the remaining part of the opto-electrical isolator. The emitter of PT1 is grounded. Five volts DC is applied through resistor R2 to the collector of PT1 as shown.

Thus, the collector of the phototransistor PT1 provides a square wave output of 60Hz frequency. This 60Hz square wave is used as a master clock to keep track of the elapsed running time.

The 60Hz square wave is input into a divide by 180 counter, C1 as shown. The operation of counter C1 is controlled by switch S2. When switch S2 is in the stop position counter C1 is set to 0 and prevented from operating. When switch S2 is in the start position counter C1 is enabled.

The output of counter C1, when enabled, consists of a pulse train of 100 nanosecond (minimum) pulses at the rate of one every 3 seconds. This rate of one every 3 seconds results from dividing the square wave frequency of 60 pulses per second by 180 to establish a frequency of 1 pulse every three seconds.

The output of counter C1 is applied to elapsed time counter C2. Counter C2 keeps track of the total elapsed time in increments of three seconds. This equates to 20 counts to the minute. When the total count equals 200 (10 minutes) the counter disables itself and must be reset in order to again become operational. Switch S2 resets counter C2 when placed in the start position. The output of counter C2 is an eight bit binary number indicative of the total count of elapsed time. This count is applied to comparator K1 as shown.

A 1MHz system clock L1, which has a square wave output as illustrated, is also enabled by the elapsed time counter. Counter C2 provides this enable signal to clock L1 when the elapsed time count is equal to or more than 20 which occurs after 1 minute of elapsed time. The output of clock L1 is gated to a 0-200 binary counter C3 and to a divide by 20 counter C4. When enabled through the gate clock L1 indexes both counter loads in parallel. Binary counter C3 provides its count output (eight bits) to the digital comparator K1 where its count is compared to the count of the elapsed time counter C2. Every time a comparison is realized, comparator K1 provides a pulse output (100 nanosecond minimum period) which resets, through gate G2, binary counter C3. Counter C3 is also reset by the output of counter C1 through G2. Comparator K1 indexes four digit decimal counter C6 which is reset by the output of counter C1.

The output of four digit decimal counter C6 is fed into four digit seven segment LED numeric display 11. This display shows the number entered via the four position numeric switch 12 divided by the elapsed time. This computation takes place every 3 seconds and takes a maximum of 10 milliseconds to complete. The output of the divide by 20 counter C4 indexes decimal counter C5. The output of decimal counter C5 is compared to the setting of numeric switch 12 which has been set to conform to the number of words in the article being read by the student. When a comparison is realized the output from clock L1 is disabled by an input to gate G1. Four stage counter C5 and divide by 20 counter C4 are reset by the 3 second pulse output from counter C1.

Thus the computation consists of breaking a pulse train, equal to the number of words in the article to be read by the student, scaled such that 20 pulses equal 1 word, into segments equivalent to the elapsed time. These segments are counted and displayed so that when the student finishes the article the four digit seven segment LED display shows the reading speed, for a three second interval, in words per minute.

While I have described above the principles of my invention in connection with a specific apparatus it is to be most clearly understood that this description is made only by way of example and not as a limitation to the scope of my invention as set forth in the objects thereof and in the accompanying claims.

What is claimed is:
1. A reading rate indicator comprising:
elapsed time counting means;
input data entry means to allow the entry of a number corresponding to the number of words of text to be read;
computation means to operate on the output of the elasped time counter and the input data entry means to compute a number representative of a reading rate in words per minute;
display means to display the results of the computation.
2. The device according to claim 1 wherein the input data entry means comprises a numeric switch.
3. The device according to claim 2 wherein the display means comprises light emitting diodes.
4. The device according to claim 3 wherein the computation is repeated at fixed intervals of less than 5 seconds.

* * * * *